Aug. 7, 1951  A. S. FEILD  2,563,017

FLOATING ROOF STORAGE TANK

Filed Jan. 11, 1947  4 Sheets-Sheet 1

Inventor: Alexander S. Feild
By his Attorney: Oswald H. Milmore

Inventor: Alexander S. Feild
By his Attorney:

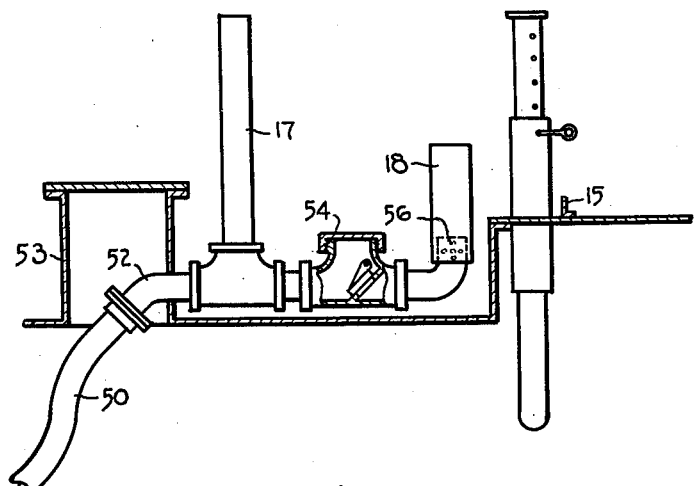
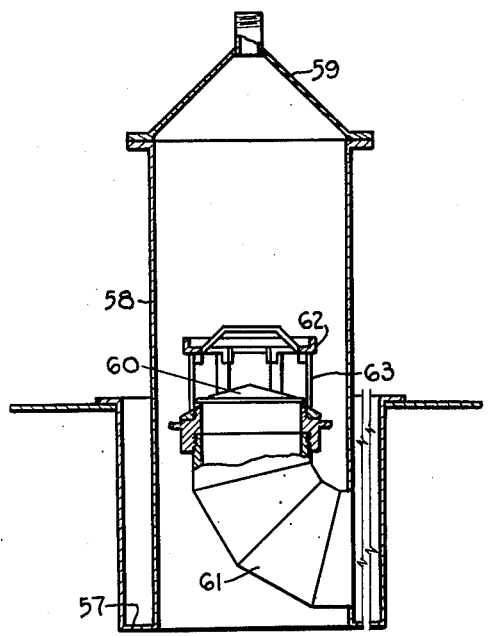
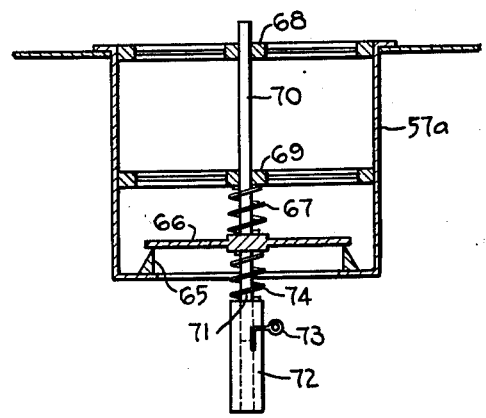

Inventor: Alexander S. Feild
By his Attorney

Patented Aug. 7, 1951

2,563,017

UNITED STATES PATENT OFFICE 2,563,017

FLOATING ROOF STORAGE TANK

Alexander S. Feild, Houston, Tex., assignor to Shell Development Company, San Francisco, Calif., a corporation of Delaware Application January 11, 1947, Serial No. 721,630

5 Claims. (Cl. 220—26)

This invention relates to storage tanks suitable for storing volatile liquids, such as gasoline and other petroleum products, of the type having a roof floating on the stored liquid, and vertically movable with the tank shell to change the storage space as the stored liquid is introduced into or drained from the tank. The instant invention is, more particularly, concerned with the structure of the floating roof and with a roof adapted to carry a body of liquid, such as water, on its upper surface to insulate the stored liquid from the heat of the sun and to create a sufficient downward pressure on the stored liquid to minimize vaporization.

The object of this invention, generally, is to provide an improved floating roof suitable for sustaining a body of liquid on its upper surface.

It is a specific object of the invention to provide an improved floating roof structure suitable for carrying a body of water, the greater portion of which may be constructed of thin metal, and to provide means for controlling the flexing of the roof which results from uneven distribution of loads on the roof and from changes in the height of the water stored thereon.

It is a further object to provide a floating roof, suitable for carrying a body of water, in which the load at the marginal portion thereof may be adjusted independently of the height of the body of water on the roof to compensate for the weight of sealing means and stiffening elements near the tank walls.

Still another object is to provide a floating roof, suitable for carrying a body of water, from which the water may be drained automatically when the stored liquid is drained therefrom and the upward pressure of the stored liquid becomes insufficient to support the loaded roof, thereby preventing damage to and distortion in the roof.

Still another object is to provide a floating roof, suitable for carrying a body of water, provided with a water supply and drainage system for flowing water onto the roof and for draining water from the roof automatically to the proper level so arranged as to obviate the danger of loss of stored liquid in the event of a leak in said conduit means.

A further object is to provide a pressure-responsive valve structure which will automatically dump the water from the surface of the roof when the pressure of the stored liquid beneath the roof becomes insufficient to sustain the water-loaded roof.

A still further object is to provide valve structures necessary for the introduction to and discharge of water from the top of the floating roof without danger of loss of stored liquid in the event of a leak in the conduit means associated therewith.

Other objects of the invention will be apparent from the following description, taken together with the drawings forming a part thereof, in which:

Fig. 5 is an enlarged vertical cross sectional view of the water supply and discharge assembly;

Fig. 6 is an enlarged vertical cross sectional view of the emergency water dumping valve; and Fig. 7 is a vertical cross sectional view of an alternate form of the emergency water dumping valve.

Figure 1:
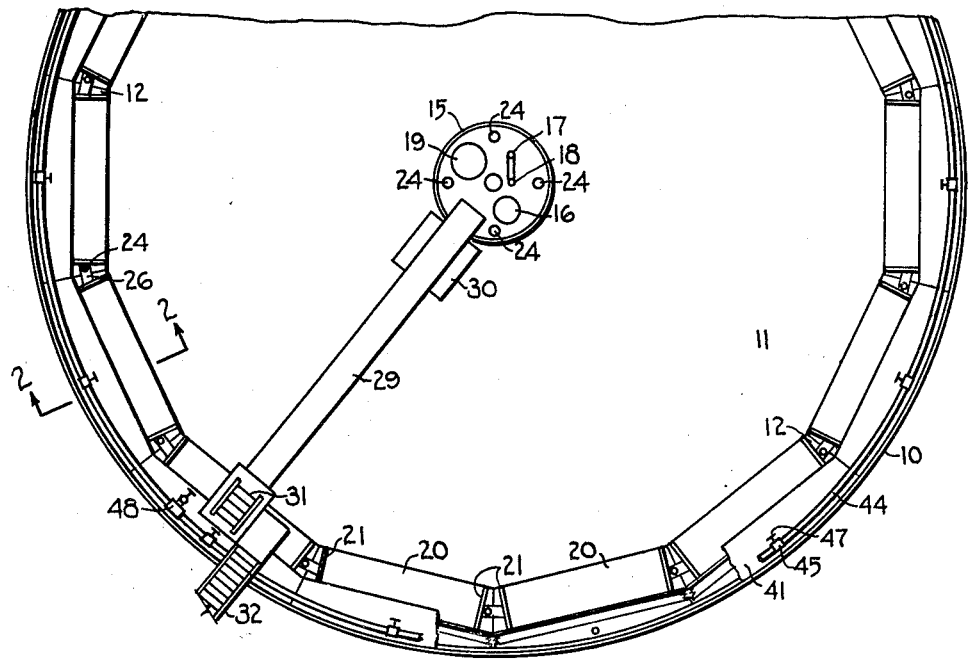
Fig. 1 is a partial plan view of a storage tank constructed according to my invention.
Figure 2:
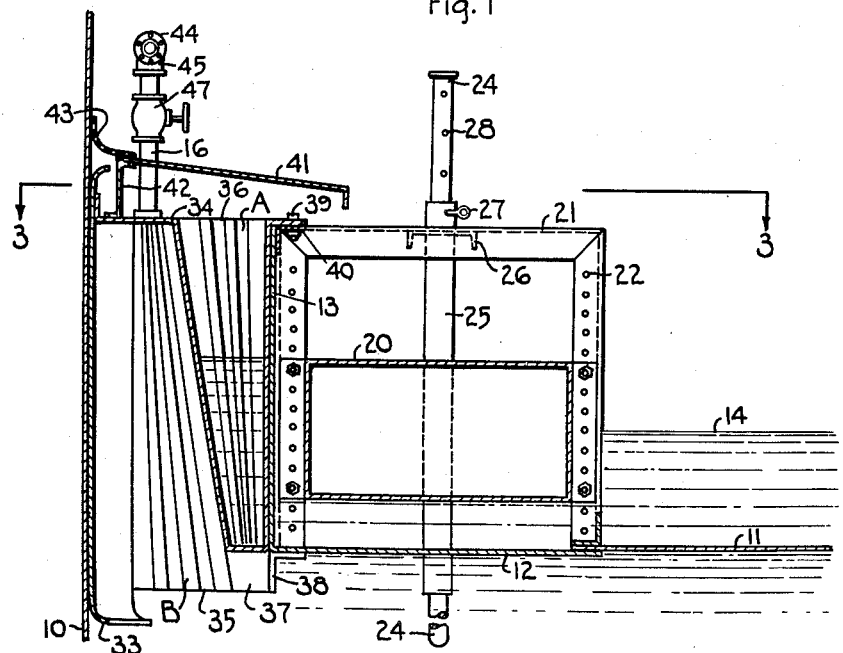
Fig. 2 is an enlarged fragmentary sectional view taken on line 2—2 of Fig. 1.
Figure 3:
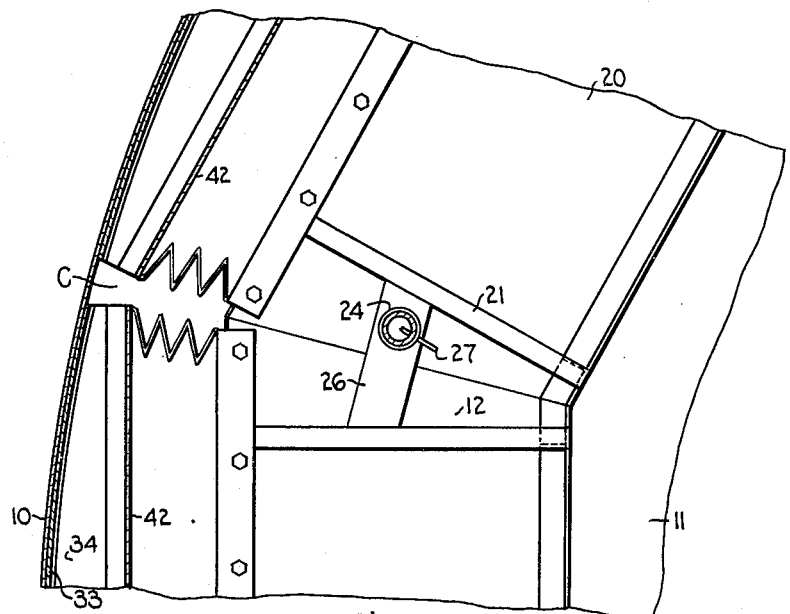
Fig. 3 is a fragmentary horizontal section view taken on line 3—3 of Fig. 2.

Floating roof tanks are provided with sealing shoes engaging the inner wall of the tank to center the roof within the tank and to seal off the annular space between the periphery of the roof and the tank wall. These shoes and the supports therefor usually impose a peripherally concentrated load on the roof which is different from the average weight of the roof per square foot of area. Unbalanced loading is, moreover, brought about by the heavier structural parts used at the outer edges of the roof to stiffen it, particularly when the main portion of the roof deck is constructed of light-weight sheet metal. While such peripheral loading usually exceeds the average loading, even with water on the roof, it may at times be less than the average loading; this would occur when a considerable head of water is standing on the roof because the water does not extend radially all the way to the tank wall, but only to the sealing elements supporting the sealing shoes, while the hydrostatic pressure of the stored liquid is effective even under the sealing elements.

When the peripheral loading exceeds the average load the center of the roof tends to bulge upwardly. This causes water to flow toward the tank wall and still further unbalances the load. Conversely, when the peripheral loading is less than the average load the center tends to sag and becomes still further loaded by the flow of water toward the center.

In accordance with this invention it was found that a floating roof tank, suitable for supporting water, can be constructed of relatively light material by providing load adjusting means at one or more peripheral portions of the roof for adjusting the load on the roof independently of the height of the body of water thereon. In the preferred embodiment, the load adjusting means take the form of pontoons floating in the water and vertically adjustable in brackets secured to the roof. By raising the pontoons in the brackets the peripheral loading is increased; and by lowering the pontoons to obtain a greater submergence, the peripheral loading is decreased.

In another embodiment, the load adjusting means takes the form of troughs or bins, disposed circumferentially on the roof, and the peripheral load is balanced by loading sand or other weight in them as required.

While the invention is intended for use primarily with roofs of the type shown in the drawings, having no pontoons beneath the roof, it can also be applied to pontoon-supported roofs.

By the load adjustment means of this invention it becomes possible to impose considerable pressure on the surface of the stored liquid. This, in turn, presents two problems, the effect of draining the stored liquid from the tank, and that of a leak in the water supply and drainage system.

When the stored liquid is withdrawn from the tank the roof falls until it rests on the tank bottom. Further withdrawal of stored liquid will decrease the supporting pressure of the stored liquid and may result in deformation of the heavily loaded and lightly constructed roof unless the water is drained off. As a safety measure against the forgetfulness of an operator, it is desirable to provide an emergency dump valve which will rapidly drain the water from the top of the roof whenever the hydrostatic pressure on the lower surface of the roof becomes dangerously low. Such an emergency dump valve may take any form. Two suitable embodiments of such a valve are disclosed herein. The preferred form is pressure-operated, and operates automatically when the hydrostatic pressure beneath the tank falls below a predetermined level in relation to the head of water on the roof top.

This has the advantage of being operable at any vertical position of the roof, and of having its time of operation controlled in part by the head of water on the roof. In the other embodiment the valve is actuated by a push rod which strikes the tank bottom when the roof is near the bottom of the tank.

The occurrence of a leak in the water supply and drainage system, the conduits of which pass through the stored liquid in the tank, may, in a tank of the type disclosed in this specification, result in the escape of the stored liquid, because the hydrostatic head of the stored liquid is higher than the surface of the water on the roof. This relation obtains because of the relatively greater density of the water and of the metal used in the roof-structure in comparison to the density of the stored liquid. The water supply and drain conduits are, in most tanks, controlled from a point near the ground, outside of the tank, and the upper end of the drainage system terminates at the level of the surface of the water at an overflow pipe. Should a leak occur in these conduits, the stored liquid would enter the conduits and escape, overflowing to the surface of the water. To avoid this it is desirable to make use of a water supply and drainage system which does not pass through the stored liquid, or to utilize the improved valve system described in this specification, which is adapted to prevent the escape of stored liquid.

The water-loaded floating roof of this invention operates most effectively when reliable sealing means are used to seal the roof to the tank wall, and I prefer to employ the bellows-type sealing element illustrated in the drawings, and more completely described and claimed in my copending application, Serial No. 721,629 filed January 11, 1947. Other types of sealing means may, however, be employed.

Referring to the drawings, the invention is shown as applied to a storage tank having a circular side wall 10. The floating roof comprises a central portion 11, constructed preferably of thin metal, such as resilient sheet metal. The central portion 11 may be constructed of a number of smaller sections welded together, the number of such sections being dependent upon the maximum sizes commercially available and the size of the tank. Heavier marginal rim angles 12, having upright legs 13, are welded to the outer edge of the central portion 11. The rim angles 12 give the roof a polygonal outline, and the upright legs 13 are welded together to form the tank into a water-tight basin, for containing a body of water 14. Legs 13 should extend to above the hydrostatic head of the stored liquid to prevent overflow thereof onto the deck.

A central, circular stiffening angle 15 provides support for a manhole 16, the water supply and drainage system comprising water supply pipe 17 and overflow pipe 18, and an emergency dump valve 19.

The load adjusting means in the embodiment of Figs. 1-4 comprises a plurality of pontoons 20, mounted over the rim angles 12 and secured thereto by inverted U-frames 21. As is seen from Fig. 2, the height of the pontoon can be adjusted by bolting the pontoon at any height on the frames 21 by passing bolts through the holes 22 of the frame and corresponding holes in the laterally protruding end plates of the pontoons. When the center of the roof is found to sag too much, the pontoons are raised to increase the peripheral loading; conversely, when the center bulges upwardly, they are lowered to decrease the peripheral loading. At least partial submergence of the pontoons will usually be necessary to counterbalance the weight of the heavy rim angles 12 and the sealing elements to be described.

To support the roof on the tank bottom when the tank is drained, a plurality of legs 24, is provided, four being shown within the stiffening angle 15 and one between each pair of adjacent pontoons. The legs are vertically adjustable and slide within a telescoping tube 25 extending through and sealed to the rim angle 12 or stiffening angle 15. Rigidity for the legs at the rim angles is insured by mounting channel bars 26 between adjacent frames 21 and welding the tubes 25 into holes therethrough. The height of the legs 24 may be adjusted by inserting a pin 27 through a transverse hole in the tube 25 and through any one of the holes 28 in the leg. 29 is a gangway, supported by rectangular pontoon 30 and by the upright leg 13 of one of the angle rims. 31 and 32 are ladders.

The roof may be sealed to the tank wall by any means. In the preferred sealing means, described more particularly in the aforesaid copending application, each sectional sealing element comprises a sealing shoe 33, curved to fit against the tank wall and having the top and bottom edges curved in to ride over irregularities of the wall. The sealing shoe is connected to the roof deck by a compartmented pressure seal comprising a resilient sealing sheet 34 folded along flexure lines parallel to the edge of the rim angle 12 to provide a trough A and an inverted trough B. The outer edge of the sheet 34 is welded to the sealing shoe. The ends of the inverted trough B are sealed by bellows 35, welded to the sealing shoe and to the sheet 34 and extending to below the level of the roof deck 11. The ends of the trough A are closed by bellows 36. A sealing plate 37 is attached below the sheet 34 and welded to the lower part of the bellows 35 to prevent the escape of gas from the interior of the trough B to the open space between adjacent sealing elements. The sealing plate 37 is an engagement with angle piece 38, welded to the lower side of the angle 12 and extending a short distance to either side of the joint between adjacent sealing elements. Each sectional sealing element is detachably mounted on the roof by bolts 39 engaging an angle 40 permanently attached to the top of the leg 13.

A rain shield 41, constructed of thin sheet metal, is optionally provided to prevent rain water from entering the trough A. It is supported by a Z-shaped rain gutter 42 mounted on the sealing sheet 34 and extending the length of the sealing section, whereby water seeping into the space between the tank wall and the trough A is prevented from draining into the trough, and will flow into the interior of the tank at the open spaces C (see Fig. 3) between adjacent sealing sections. A curved shingle 43, constructed of flexible or pliable material such as fabric or rubber, engages the tank wall and leads water over the shield 41. The rain shields 41 are constructed in sections corresponding to the sectional sealing elements and overlap slightly to provide a continuous shield.

Water is placed in the trough A to exert a pressure against the trough walls tending to distend the trough and bellows and center the roof within the tank. Vapors from the stored liquid collect within the inverted trough B and tend to distend the trough, thereby urging the sealing shoe 33 against the tank wall. To equalize the vapor pressure in the several sealing sections a vapor pressure equalizer is optionally provided. It comprises an annular pipe 44 having a T fitting 45 over each inverted trough B, and connected to each inverted trough by riser pipes 46 and valves 47. The T's 45 have bolted flanges to permit a section of the pipe 44 to be readily removed. When the sun strikes one side of the tank, tending to increase the vapor pressure there, this system of pipes equalizes the pressures. The valves permit the pipe 44 to be cut off from flow communication with the sealing sections as would be necessary, for example, when one of the sections must be removed for repair. The maximum pressure may be regulated by means of a pressure relief valve 48.

Figure 4:
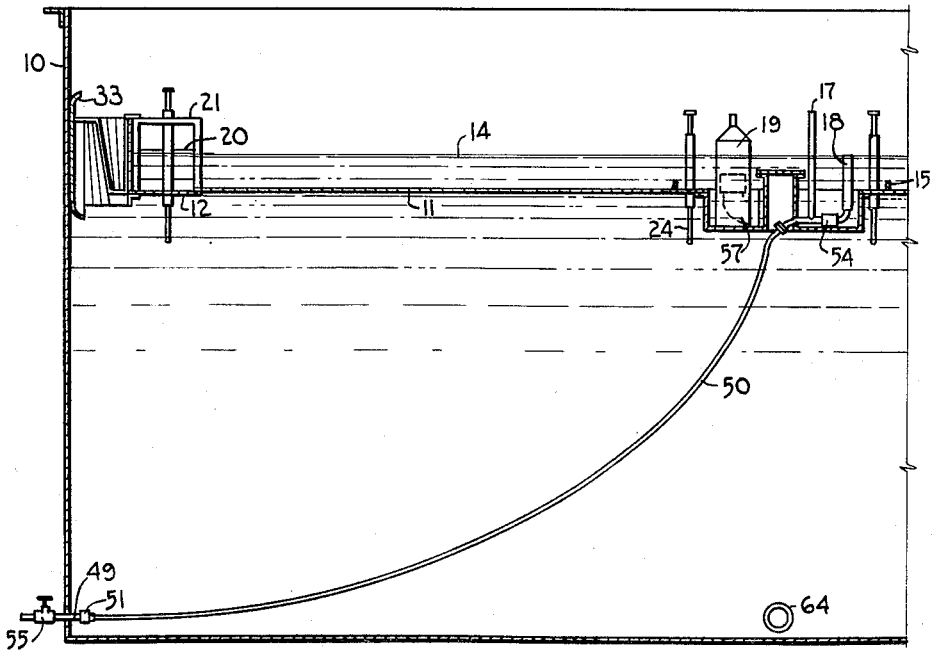
Fig. 4 is a vertical cross sectional view of the storage tank and floating roof.

Referring to Figs. 4 and 5, the water supply and drainage system comprises a pipe 49 passing through the tank wall near the bottom, a flexible hose 50 detachably thereto coupled at 51, and the conduit elements shown in Fig. 5. The upper end of the hose is coupled to a pipe 52 within a hatch 53, permitting access. The water supply pipe 17 extends to a level higher than the hydrostatic head of the stored liquid, and when water is supplied through the pipe 49 under sufficient pressure it flows out of the top of the pipe 17.

Overflow pipe 18 extends to the intended surface of the water on the roof. Should an excess of water occur on the roof it will overflow and pass through the check valve 54 and drain through the hose upon opening the valve 55. Should a leak occur in the hose or its couplings when the valve 55 is closed the stored liquid would tend to rise in the hose. The hydrostatic head of the stored liquid, even if its density is the same as that of water, is normally higher than the surface of the water 14, due to the weight of the roof; and when liquids of lower density are stored it may be considerably higher than the level 14. The check valve 54, however, prevents the escape of stored liquid through the overflow pipe 18, and such liquid would rise within the pipe 17 without overflowing. The overflow pipe 18 is detachably mounted, and to drain water from the tank it is removed from its supporting pipe. The latter may be provided with perforations 56 to permit drainage of water to a lower level.

Referring to Figs. 4 and 6, the emergency dump valve designated generally as 19, is mounted in a sump 57 within the stiffening angle 15. Cylindrical shell 58, closed by conical dome 59, rises from the bottom of the sump and has its interior in communication with the stored liquid. Water from the top of the roof normally fills the annular space around the shell 58 and is in communication with the lower side of valve disc 60 through conduit 61. The valve, mounted on the end of the conduit 61, comprises a cage 62 having vertical guides 63 for the disc 60. The top of the conduit 61 is so positioned that the disc 60 will operate as described below, taking into account the desired height of the water on the roof, the weight of the roof and the density of the stored liquid. Mounting the disc valve higher will cause it to operate only with a deeper layer of water on the roof or with a lower pressure of the stored liquid.

The stored liquid fills the space within the shell 58 and exerts a pressure on the top of the disc tending to keep it seated, while the upward pressure of the water tends to open it. Normally the water pressure is smaller and the valve remains seated. When, however, the stored liquid is drained through drain pipe 64, the hydrostatic head of the stored liquid drops, permitting the water to unseat the valve and permit the water to flow through the shell 58 into the tank. This valve is constructed of generous dimensions, so as to permit the rapid dumping of water and prevent damage to the roof in the event that the operator forgets to drain the water through the normal drainage system before emptying the tank. This pressure-balanced valve will come into operation upon draining the tank only when an appreciable amount of water is on the end, the exact amount being dependent upon the vertical location of the valve with respect to the deck of the roof, thereby preventing the needless dumping of water each time the tank is emptied.

Referring to Fig. 7, an alternate form of emergency dump valve is shown. This valve is mounted in a sump 57a and comprises an annular valve seat 65 and valve disc 66, normally closed by the force of spring 67 and the pressure of the water on the upper face of the disc. The disc is aligned in spiders 68, 69 by vertical shaft 70. A shaft 71 extends below the disc and is telescoped into a bumper tube 72, secured by pin 73 passing through a slot in the tube and a circular hole in the shaft. A spring 74 slightly weaker than spring 67, urges the bumper tube downwardly. When the tank roof approaches the bottom of the tank the tube 72 strikes the bottom, compressing the spring 74. After partial compression of the spring, it lifts the disc 66 against the force of the spring 67, permitting the escape of water. The spring 74 may be further compressed after the valve has been opened, to prevent damage to the valve upon further downward movement of the tank.

Figure 8:
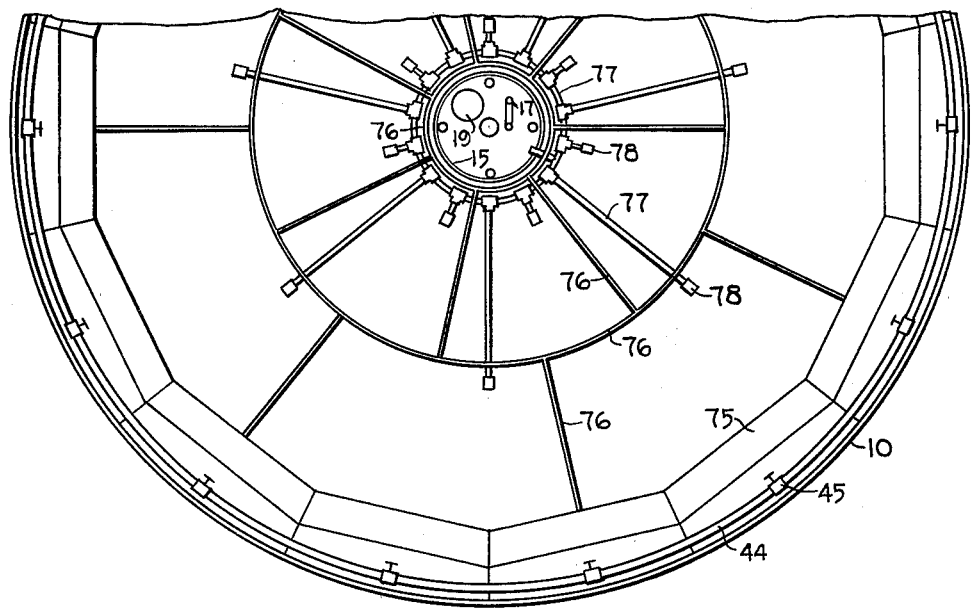
Fig. 8 is a partial plan view of a modified form of the roof.
Figure 9:
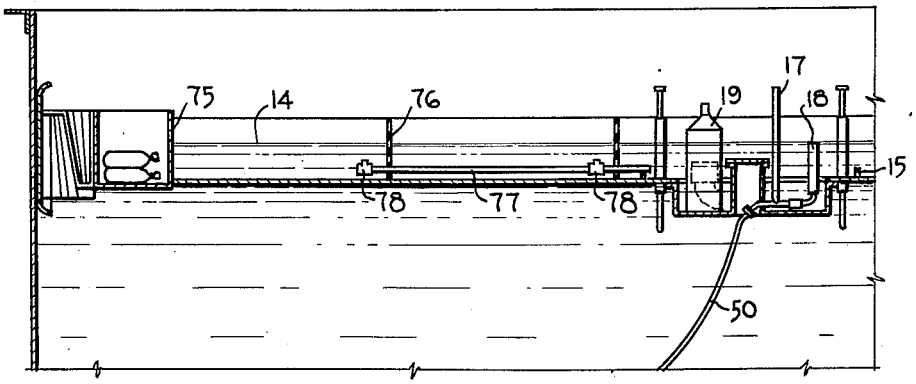
Fig. 9 is a fragmentary vertical cross sectional view of the form of Fig. 8.

An alternate form of load adjusting means is shown in Figs. 8 and 9, wherein the roof is provided with bins 75 instead of adjustable pontoons 20. These bins may be filled with sand bags, or water, or other weights as required to adjust the load on the roof and prevent sagging or bulging at the center.

Figs. 8 and 9 further show an arrangement of dams on the roof which may be optionally applied to the forms of the invention previously described. When a roof carrying water is, for any reason, tilted the water flows to the lowered side, shifting the center of weight, and tending to tilt the roof still further. The pressure of the stored liquid on the lower side of the roof is, however, increased by such tilting, causing the resultant of the upward thrust to shift in the same direction and tending to right the roof. When the density of the stored liquid is less than that of water this righting action may under certain conditions be insufficient to right the roof. Thus, for a flat, circular roof without dams (and without the pontoons 20 or bins 75), it is a requirement for static stability that the ratio of the diameter of the water-covered area (approximately the distance between opposite upright legs 13 in the tank of Figs. 1 to 4) to the diameter of the effective area of the roof exposed to the stored liquid be less than the fourth root of the specific gravity of the stored liquid. Since most of the annular area between the roof and the tank wall is covered by the sealing elements and exerts an upward pressure, a part of this is effective in righting the roof. However, the gush of a large amount of water toward the low side could still unbalance the roof meeting only the requirements for static stability.

To insure stability it may, particularly in larger tanks, be desirable to divide the roof into compartments by means of dams. These dams may be provided with openings to permit the water level to be equalized slowly, and operate merely to prevent the free flow of water at too rapid a rate. When the dams are substantially watertight, the special drainage system shown in the drawings is necessary. In the drawings, the dams are indicated at 76, constructed so as not to give rigidity to the thin, flexible roof deck 11. They may be constructed of rubber or of treated fabric, stiffened with metal angles at intervals. The drainage system comprises pipes 77 having an inlet within each compartment and a check valve 78 for each inlet, to prevent the flow of water from one compartment into another. The drainage system is open to the center compartment, from which the water may be discharged through the overflow pipe 18. To fill the compartments water is introduced into the compartment through the pipe 17, and overflows the dams, which are only slightly higher than the ultimately desired water level. When the outermost compartments carry sufficient water excess water automatically flows off through the pipes 77 and overflow pipe 18.

I claim as my invention:

1. In combination with a storage tank, a roof comprising a deck and adapted to sustain a body of water on its deck, a body of water maintained on the deck throughout the upper surface thereof, and vertically bodily adjustable pontoons mounted on the top of the deck near the periphery of the roof and secured to the deck at a level to be at least partially submersible in said body of water.

2. In combination with a storage tank, a roof comprising a deck and adapted to float on liquid stored in the tank and to sustain a body of water on its deck, a body of water maintained on the deck throughout the upper surface thereof, and vertically bodily adjustable pontoons mounted on the top of the deck near the periphery of the roof and secured to the deck at a level to be at least partially submersible in said body of water.

3. In combination with a storage tank, a roof comprising a deck portion formed of thin resilient, substantially flat metal extending throughout the major central part of the roof adapted to float on the liquid stored in the tank and a stiffening rim of thicker metal extending upwardly from the deck completely about the periphery thereof for retaining a body of water on the deck, said main deck portion being free to flex vertically in accordance with the upward hydrostatic pressure of liquid stored in the tank and downward hydrostatic pressure of water on the deck; a body of water maintained on said deck; means for maintaining said body of water on said deck to a predetermined level; vertically adjustable pontoon means carried on the upper side of the deck at the periphery thereof for displacing water thereat for adjusting the load on the roof between the peripheral portion and the central portion of the roof to maintain said main deck portion substantially flat; a water drain for said roof having an emergency dump valve arranged to discharge said water from the roof when the stored liquid is drained from the tank for preventing the hydrostatic pressure of the water from flexing said deck portion downwardly when the upward hydrostatic pressure of the stored liquid is removed.

4. The combination according to claim 3 wherein said emergency dump valve has an element responsive to the said hydrostatic pressures of the body of water and the stored liquid arranged to open the valve when the hydrostatic pressure of the stored liquid is decreased to a value less than that of the body of water.

5. In combination with a storage tank, a roof comprising a deck portion formed of thin resilient metal extending throughout the major central part of the roof adapted to float on the liquid stored in the tank and a stiffening rim of thicker metal extending upwardly from the deck completely about the periphery thereof for retaining a body of water maintained on the deck, said main deck portion being free to flex vertically in accordance with the upward hydrostatic pressure of the liquid stored in the tank and the downward hydrostatic pressure of water on the deck; a body of water on said deck; a plurality of pontoons over the roof near the periphery at elevations to be partly submerged in said body of water and wholly above the deck; and adjustable connecting means securing said pontoons to the roof at individually selectable heights above said deck, whereby said pontoons can be maintained partly submerged in said body of water at individually controlled depths for balancing the load between the central portion and the peripheral portion of the deck.

ALEXANDER S. FEILD.

REFERENCES CITED

The following references are of record in the file of this patent:

UNITED STATES PATENTS

| Number | Name | Date |
|---|---|---|
| 1,426,998 | Leland | Aug. 22, 1922 |
| 1,592,244 | Wiggins | July 13, 1926 |
| 1,643,924 | Clark | Sept. 27, 1927 |
| 1,904,339 | Wiggins | Apr. 18, 1933 |
| 1,979,272 | Kramer | Nov. 6, 1934 |
| 1,990,627 | Wiggins | Feb. 12, 1935 |
| 2,287,772 | Wiggins | May 12, 1942 |
| 2,297,985 | Rivers | Oct. 6, 1942 |
| 2,430,592 | Wiggins | Nov. 11, 1947 |